United States Patent [19]

Gerdes

[11] 3,985,007

[45] *Oct. 12, 1976

[54] SCREW CAP WITH LOCK CYLINDER

[75] Inventor: Theo Gerdes, Langenfeld, Germany

[73] Assignee: Blau KG Fabrik fur Kraftfahrzeugteile, Langenfeld, Germany

[*] Notice: The portion of the term of this patent subsequent to Aug. 7, 1990, has been disclaimed.

[22] Filed: July 22, 1974

[21] Appl. No.: 490,295

[30] Foreign Application Priority Data

July 24, 1973 Germany............................ 2337565

[52] U.S. Cl................................. 70/172; 220/304; 220/203; 220/324
[51] Int. Cl.²......................................... B65D 55/14
[58] Field of Search ........... 220/288, 203, 319, 304, 220/324, 210, 205, 206, 295, 316; 70/171, 172

[56] References Cited
UNITED STATES PATENTS

| | | | |
|---|---|---|---|
| 3,203,445 | 8/1965 | McCormick | 220/206 |
| 3,248,119 | 4/1966 | Smith et al. | 220/378 |
| 3,334,774 | 8/1967 | Poltorak | 220/378 |
| 3,587,912 | 6/1971 | Ohta | 220/206 |
| 3,750,434 | 8/1973 | Gerdes | 70/172 |
| 3,820,680 | 4/1974 | Friend | 220/203 |

Primary Examiner—William Price
Assistant Examiner—Joseph M. Moy
Attorney, Agent, or Firm—Michael J. Striker

[57] ABSTRACT

An arrangement of screw caps with a lower screw cap portion and an upper rotable cap portion freely rotatable relative to the lower portion. A lock cylinder is centrally inserted and extends through the cap portions and cooperates with a compression spring and a bridge located between both cap portions to limit the cap tightening torque when the screw caps are secured on containers or screw pipe sockets. The lock cylinder is sealed by a sealing ring located within the lower screw cap portion by compressing the ring intermediate the radially-extending edge portions of a hole through which the lock cylinder passes and a projecting ring flange of the lock cylinder with the aid of the compression spring abutting against an abutment member positioned adjacent the ring flange.

10 Claims, 3 Drawing Figures

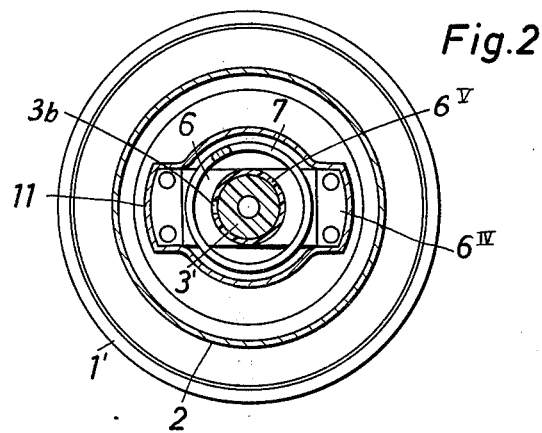
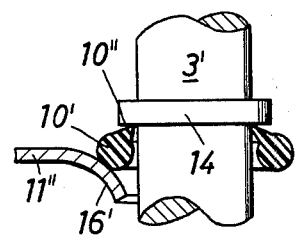
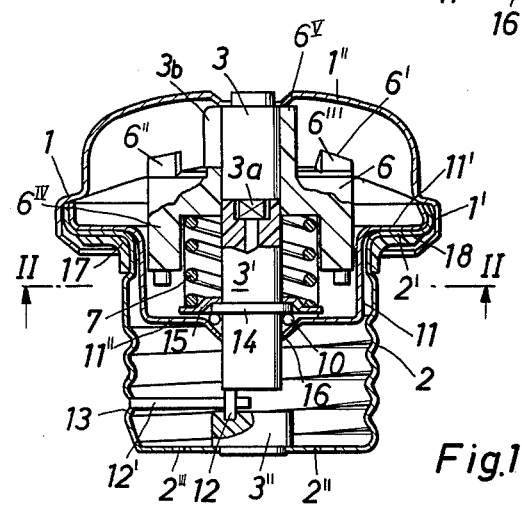

SCREW CAP WITH LOCK CYLINDER

BACKGROUND AND SUMMARY OF THE INVENTION

The present invention relates to improvements in screw closure caps having a lower screw cap portion and an upper cap portion freely rotatable relative to the lower cap portion. The cap portions are urged towards each other by spring tension and together form an assembled unit. A lock cylinder extends centrally through the interior of the cap portions.

In a screw closure cap, a spring coupling and bridging part is used between the two cap portions to limit the cap-tightening torque when securing the cap to containers or screw pipe sockets. The coupling bridge is mounted on both sides in guide grooves of the lower screw cap portion and engages upwardly, by means of inclined surfaces, in the longitudinal direction, in a hollow, outwardly pressed gripping rib portion of the upper rotatable cap portion. Thus, the lower cap portion frictionally engages the upper rotatable cap portion via a compression spring coupling only until a predetermined tightening torque, whose value depends upon the spring tension force used, has been attained. At this point and in reaction to the force of the mutual thread application pressure, the inclined surfaces of the coupling bridge will spring back and disengage from the upper rotatable cap portion slipping in a ratchet-like manner. Upon reversal of the direction of rotation for the purpose of releasing the cap from its locked position, vertical cam surfaces will immediately frictionally re-engage the hollow rib portion of the upper rotatable cap portion so as to permit easy opening. The arrangement ensures the closure screw caps are not tightened excessively.

In the prior art, it is known to provide a screw closure cap with a lock cylinder centrally inserted and extending through the cap and operative by key actuation. It is further known to enclose the lock cylinder within the lower screw cap portion by a sealing ring in order to mount the cylinder within a passage and seal it against the ambient atmosphere. Locking catches are provided and are actuated by means of eccentric pins which are mounted below the passage which receives the lock cylinder; the catches are mounted to engage vertically to the axis of the lock cylinder, i.e. laterally in the radial direction of the closure cap under the thread convolutions of a container or pipe socket to be closed.

It is an object of the present invention to provide an arrangement for the sealing of the lock cylinder provided within a screw closure cap so that the sealing is subjected to a constant application pressure.

The present invention obtains this sealing effect by locating a washer at one end of the compression spring which is located beneath a coupling bridging member and is operative for limiting the cap tightening torque. The spring is preferably helical and coaxially surrounds the lock cylinder which has been passed centrally through the cap. The spring abuts the washer which has been placed beneath the spring onto a projecting ring; flange of the lock cylinder and the washer-flange combination cooperates to compress a sealing ring positioned intermediate the combination and the radially-extending edge portions of the hole through which the lock cylinder has passed subject to the predetermined tensional force of the spring.

BRIEF DESCRIPTION OF THE DRAWING

The invention will be described further, by way of example, with reference to the accompanying drawing, in which:

FIG. 1 is a medial section through a screw closure cap showing a compression spring, a lock cylinder, and a sealing ring arrangement;

FIG. 2 is a section taken on the line II — II of FIG. 1; and

FIG. 3 is a modified form of sealing ring arrangement.

DESCRIPTION OF THE PREFERRED EMBODIMENTS

A screw closure cap is shown in FIGS. 1 and 2 having means for limiting the level of thread-tightening torque and comprises two cap portions mounted to be rotatable relative to each other. The cap portions comprise a lower, cup-shaped drawn-in screw cap portion 2 having a flanged edge 2' and an upper, rotatable cap portion 1 having an externally drawn-down overlapping edge 1' and a pressed-out hollow grip portion 1''. Lugs 6' extend upwardly on both sides of the bridge 6 and have inclined surface portions 6'' which frictionally engage the grip portion 1'' when the latter is turned in the clockwise locking direction and, upon reaching a predetermined tightening torque level as measured with respect to the container or socket thread (not shown) which is closed by the screw cap, automatically release and slip in a ratchet-like manner so as to permit the displacement of the rotatable cap portion 1, 1' and 1'' relative to the inclined surface portions 6'' of the bridge 6. However, by rotating the cap in the reverse direction of rotation (anticlockwise) for the purpose of opening or removing the cap, the vertical surface portions 6''' of the upwardly aligned projecting camming lugs 6' on the opposite side of the coupling bridge 6 will engage with the inside of hollow rib 1'' of the upper rotatable cap portion. The bridge 6 is urged upwardly against the hollow rib, by the action of a compression spring 7 which is located below the bridge 6 and which also is operative to forcibly engage and carry the lower screw cap portion 2 along with the upper portion. The coupling bridge 6 has a cylindrical part 6$^{IV}$ on both sides extending in the axial direction of the cap and is located in pressed-out grooved guides 11 of a cup-shaped drawn-in insert member 11' which also with base part 11'' extends coaxially within the screw cap portion 2. This insert member 11/11'/11'' is uniformly and securely pressed together with the flanged edge 2' of the screw cap 2 via the edge on the upper angled flange portion 11' by interposition of a sealing washer or ring 18.

In accordance with the applicant's patent U.S. Pat. No. 3,750,434, issued Aug. 7, 1973, the entire contents of which are hereby incorporated by reference, a lock cylinder is inserted in the cap and comprises assembled parts 3, 3' and 3'' which are retained in the cup base 2'' flush towards the bottom. A catch member 12' is connected to the cylinder by means of an eccentric pin 12, in a manner described in the aforementioned patent, and is mounted so as to be outwardly and laterally displaceable through slot 13 of a wall of the cap. The eccentric pin 12 is mounted so as to be rotatably displaceable within the lower lock cylinder portion 3''. Alternatively this cylinder portion 3'' sealing off the bottom is mounted in the cup base 2'' so as to be rotatably displaceable and also acts as centering for the lock cylinder seen as a whole (3/3'/3'').

The lock cylinder portion 3' passes through a hole in the centre of the cup-shaped drawn-in insert member 11' above the base portion 11'' and is provided with a ring flange 14. A sealing ring 10 is located below the flange 14, and a ring disc or washer 15 rests on this ring flange 14 and has a counterbore which is offset at the center of the washer 15', the washer 15 fits loosely on the flange 14, and thus also acts as an abutment for the compression spring 7 at the end thereof beneath the coupling bridge 6. The compression spring 7 acts on the coupling bridge member 6, 6', 6'' and biasses the latter upwardly towards the upper rotatable cap portion 1 to limit the cap tightening torque by the generated frictional force and, at the same time, abuts the freely supported disc 15 at the bottom thereof. The spring 7 applies resilient pressure on the disc 15 which is urged against the ring flange 14 of the lock cylinder. The sealing ring 10 located below the flange 14 is continuously subjected to compression forces and is thus firmly seated and impressed in the radiused radially extending or conically drawn-in edge portions 16 of the hole through which the lock cylinder portion 3' passes through; the compression forces thereby forcibly seal the lock cylinder 3'. For the central guidance and proper insertion of the assembled lock cylinder (3/3'/3'') having a rectangular pin (3a) which must properly engage the central cylinder portion 3' (at 3a), or for the proper orientation and guidance of the coupling bridge 6, this bridge portion 6 has a sleeve member $6^V$ supported at its top against a central lower surface of the hollow gripping rib 1'' and which is guided on the upper lock cylinder portion 3. The cylinder portion 3 has a rib 3b projecting radially outwardly on one side which is guided in a longitudinal slot provided in the sleeve member $6^V$. The upper lock cylinder portion 3 is made of metal and has conventional holders which are actuated by a key. The cylinder is secured against undesired turning by means of the rib 3b whilst, on the other hand, the rotary movements of the key is transmitted via the pin 3a to the central cylinder portion 3' or by means of eccentric pin 12 to the catch member 12' and thereby sealing cylinder guidance 3'' within the base of the cup 2''. The lock cylinder portions 3' and 3'' may be made of plastics material. The reference numeral 2''' denotes apertures in the base 2'' of the cup which allow any liquid entering via lateral slot 13 provided for catch 12' to drain out thereof via holes 2''' which are evenly spaced on the base 2'' of the cap. A sealing member 17 is inserted beneath the flanged edge 2' of the screw cap and acts against a socket edge (not shown) of a container or a filler pipe end to be sealed.

FIG. 3 shows a modified sealing ring 10' seated below the ring flange 14 and pressed against the cylinder portion 3'. This sealing ring 10' tightly abuts against a radial edge 16' of an aperture in the base portion 11''. At the upper portion of the top of the ring 10', a pointed or jagged projecting ring portion 10'' engages below the pressure application flange 14. This arrangement reduces the surface pressure of the sealing ring between ring flange 14 and inwardly drawn aperture edge 16' (or 16 in FIG. 1). Thus, the lock cylinder components (3/3'/3'') extending downwardly therethrough are easily rotatable. This has proven favourable in practice in connection with both manufacturing and assembly tolerances of the individual assembled components. In instances where components are assembled with unfavourable tolerances, the components move stiffly because of the increased friction forces so that the actuation of the lock by means of a key may require considerable force; hence, substantially relieving the lock actuation by this special configuration of the sealing ring 10 which, according to the shape 10'/10'' shown in FIG. 3, makes the cylindrical portion 3' more easily rotatable. A modification of this sealing ring 10' may also be used which has the corresponding toothed edge 10 acting against the radial edge 16' on the diametrically opposite side with respect to the projecting portion 10'' shown in FIG. 3. Additionally, such projecting teeth portions 10'' may be provided on each side of the ring member 10'. It is also possible to use sealing rings of rubber or plastics material which are provided all around with ribs or with knurling. In all cases, the object is to reduce surface pressure relative to the cylindrical portion 3' and hence enable the lock cylinder 3 to be actuable more readily by means of a key and by means of rectangular pins 3a relative to the cylindrical portion 3'.

What we claim is:

1. A closure cap for closing a container opening, comprising cap means having an upper part and a screw-threaded lower part adapted for threaded engagement with said container opening, said lower part having an engaging portion and being rotatably coaxially connected with said upper part; means in said cap means for connecting said lower part for turning with said upper part when the latter is turned in requisite direction for screwing said cap means into said container opening and for releasing said upper part for turning relative to said lower part when a predetermined turning moment during screwing said cap means into said opening is reached, said connecting and releasing means including a compression spring; locking means extending centrally through said spring for locking said cap means in said container opening, said locking means including a lock cylinder having an annular outwardly-projecting flange; a sealing ring surrounding said lock cylinder intermediate said flange and said engaging portion; and an abutment member surrounding said lock cylinder and being in abutting engagement with said flange and said spring, said abutment member being urged towards said engaging portion and compressing said sealing ring as a function of the inherent biasing force of said spring.

2. A closure cap as defined in claim 1, wherein said upper part is formed with an outwardly-projecting hollow hand-grip portion having a pair of lower edges, and wherein said means for connecting and releasing said lower part comprises a bridge member arranged in said lower part, movable in axial direction thereof and non-rotatably connected to said lower part, said bridge member having a pair of lugs each having at one side thereof an inclined cam face for engagement with the respective lower edge of said outwardly-projecting hand-grip portion and on the other side a face extending in axial direction of said lock cylinder, said compression spring biasing said bridge member in a direction in which said lugs are yieldably held in said hand-grip portion.

3. A closure cap as defined in claim 2, wherein said lower part comprises a cup-shaped insert member having a central passage for receiving said lock cylinder, said engaging portion constituting the edge portions bounding said passage, said insert member having axially-extending guides for receiving said bridge member.

4. A closure cap as defined in claim 3, wherein said engaging portion is generally U-shaped in the axial direction so as to form radially extending edge portions.

5. A closure cap as defined in claim 1, wherein said abutment member and said sealing ring are annular so that the latter is uniformly compressed.

6. A closure cap as defined in claim 1, wherein said abutment member has an offset central portion which is in abutting engagement with said flange, and an outer portion which is in abutting engagement with said spring.

7. A closure cap as defined in claim 1, wherein said locking means further comprises a laterally displaceable catch member.

8. A closure cap as defined in claim 1, wherein said sealing ring is formed of elastomeric compressible material.

9. A closure cap as defined in claim 1, wherein said sealing ring further comprises means for reducing the friction forces existing between said lock cylinder and said sealing ring when said lock cylinder is rotated during actuating of said locking means.

10. A closure cap as defined in claim 9, wherein said friction-reducing means comprises tooth-like projections on said sealing ring.

* * * * *